Sept. 15, 1931.　　　G. G. HEGHINIAN　　　1,823,491

LIQUID LEVEL GAUGE

Filed Dec. 23, 1926

INVENTOR

Garabed G. Heghinian
BY
William W. Varney
ATTORNEY

Patented Sept. 15, 1931

1,823,491

UNITED STATES PATENT OFFICE

GARABED G. HEGHINIAN, OF BALTIMORE, MARYLAND, ASSIGNOR OF ONE-HALF TO WILLIAM W. VARNEY, OF BALTIMORE, MARYLAND

LIQUID LEVEL GAUGE

Application filed December 23, 1926. Serial No. 156,639.

My invention relates to liquid level gauges, for measuring the depth of liquid in containers of any description and at any location, and is particularly intended to be used on the dash board of automobile, aeroplane or motor boat, to indicate the amount of gasoline or fuel oil in the storage tank of same.

One object of my invention is to provide a gauge to indicate at all times correctly the content of tanks at a remote or not easily accessible places, such as roofs or buildings or storage tanks under ground as used in connection with oil heating plants and the like.

Another object of my invention is to combine two gauges on the same air line conduit, one located on or near the tank and the other at a convenient place some distance from the tank, so that reading can be taken from either gauge, whichever happens to be more convenient at the time of reading.

Another object of my invention is to provide a gauge that can be applied to any existing liquid tank with whatever quantity of liquid it may contain at the time of applying my gauge, it being unnecessary to drain the tank to install my gauge.

Another object of my invention is to provide means for recharging the air line conduit with fresh air at any time if desired, no matter whatever amount of liquid the tank may contain.

Another object of my invention is to devise a gauge that is simple and inexpensive to construct, easy to install, reliable, accurate, self adjusting and automatically compensating any disturbance created by one or by combination of several detrimental causes, like change of temperature, variation of altitude, accumulation of vapors in the air line conduit, etc.

Advantages of my invention will appear in the following specification and the novel features of invention will be particularly pointed out in the appended claims.

My invention is illustrated with the accompanying drawings, forming part of this application.

Fig. 1 shows one way of the general arrangement of the parts. In this diagram a U tube is selected as a gauge to indicate the amount of liquid in the tank. The air line conduit in the tank is made up of pipe and L's. The liquid tank is shown in section.

Fig. 2 shows another way of the general arrangement of the parts. In this diagram a diaphragm gauge is selected to indicate the amount of the liquid in the tank. The air line conduit is made up of pipe entirely. The liquid tank is shown in section.

Figure 1:
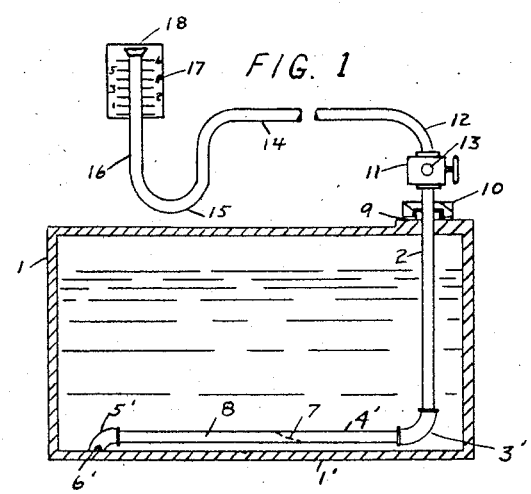
Figure 2:
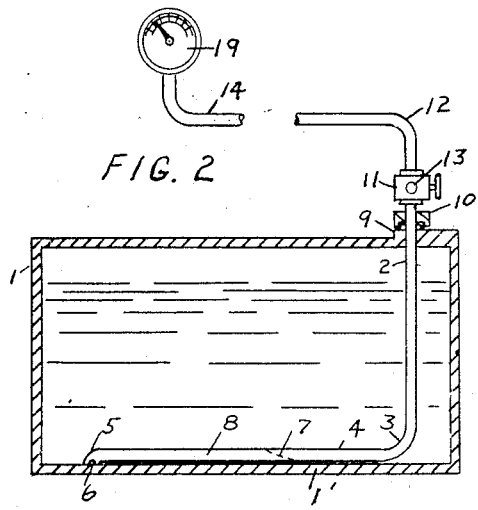
Figure 3:
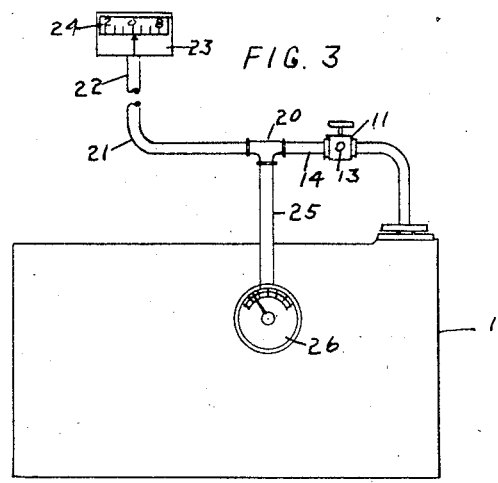
Fig. 3 shows another way of the general arrangement of parts, outside of the liquid tank. In this diagram a local gauge of diaphragm type and a distance cylindrical gauge are selected to indicate the amount of liquid in the tank, the observer using the one most convenient to him at the time of reading.

Referring to the drawings: 1 indicates a liquid tank, 1' the bottom of tank 1, 3 a bend in the pipe line 2, near the bottom of tank 1, 3' an L acting as the bent 3 to change the direction of the pipe line 2 normally to its former course, 4 a horizontal section of pipe line 2, resting directly on the bottom of tank 1, 5 a bend downward at the end of the air line pipe section 4, forming a trap for the air in the air line pipe conduit 2, 6 port holes at the end of bend 5, for communication between the liquid in the tank and the air in the air line pipe conduit 2, 5' an L at the end of pipe line 2 as an air trap, 4' horizontal section of pipe line 2 connects the L's 3' and 5'. The L's 3' and 5' are resting on the bottom of tank 1, 8 indicates liquid entering into the horizontal section of the air line 2, 7 the contact point between the liquid entering into the air line 2 and the air in the air line itself, in other words the extent of liquid entering into the air line pipe conduit 2, 9 an externally threaded thimble on tank 1, 10 a nut arranged to compress packing against the pipe 2 and thus hold the air line pipe conduit 2 in fixed position, 11 a three way valve, 12 and 14 continuation of air line pipe 2, 13 a port hole on the three way valve 11, 15 a U tube, 16 liquid in the U tube, 17 graduated scale preferably in gallons, 18 a cap on top of one of the legs of U tube 15, 19 pressure indicating diaphragm gauge, 20 a T, 21 and 22 continuation of the pipe line 14, 23 a frame holding a revolving cylinder gauge 24, 25 a branch of air line 14, leading to a local diaphragm gauge 26, located on the liquid tank 1.

In pneumatic liquid level gauges air is used in the conduit to transmit the pressure due to the effective head of the liquid in the tank to the gauge, wherever the gauge may be.

Generally speaking all pneumatic gauges are composed of two principal members. The first one is a pressure indicating member, which may be any standard type pressure indicating means, like a U tube containing some liquid in it, a dial or a revolving cylinder, all actuated under the pressure of the effective head of liquid in the tank. The second member is a gas tight air line pipe conduit, one end of which is connected to the pressure indicating member of the gauge and the other end terminates in the liquid tank, the contents of which is to be gauged.

The gas tight pipe contains air at the atmospheric pressure when the tank is empty. As soon as liquid is poured into the tank, the end of the air line pipe conduit is sealed and the air in it is trapped. As the level of the liquid in the tank rises, the increased pressure of the liquid compresses the air in the air line pipe conduit, reduces its volume, some liquid from the tank enters into the air line conduit and follows the air, pushing it forward, until the pressure of the air in the air line conduit balances the liquid pressure outside, the atmospheric pressure plus the pressure due to the effective head of liquid in the tank. This balanced air pressure in the air line pipe conduit is reflected on the pressure indicating gauge, preferably in terms of gallons of liquid in the supply tank.

The effective head of liquid is the depth of liquid represented by the difference of liquid level in the tank and the liquid level in the air line pipe conduit.

The point of contact between the liquid entering into the air line pipe conduit and the air in the air line pipe conduit, or in other words the extent of liquid entering into the air line pipe conduit would remain constant for a given depth of liquid in the tank if it was not mainly for the change of temperature. Air is greatly affected by the change of temperature. Under the same pressure volume of air increases as the temperature rises and decreases as the temperature falls, therefore the point of contact is constantly moving back and forth in the air line pipe conduit as the temperature changes.

If the air line enters and terminates vertically in a liquid tank the point of contact will rise and fall in the air line pipe as the temperature changes, making the effective head of the liquid vary. For this reason the reading on the gauge for a given depth of liquid in the tank will not be the same for different temperatures.

The novel feature of my invention is to devise the air line pipe conduit of my gauge so that for a given depth of liquid in the tank, it will maintain practically a never changing effective head. Though the temperature changes, the volume of the trapped air in the air line pipe conduit expands and contracts and the point of contact between the liquid entering into the air line pipe conduit and the air in it shifts its position to and fro. This is accomplished by adding a horizontal section to the lower end of the air line entering in to the liquid tank and terminating it with a downward bend. This horizontal section lies on the bottom of the tank and acts as an expansion joint between the liquid entering in it, and the ever changing volume of air it contains, due to the continual change of temperature. The downward bend at the end of the horizontal section of the air line pipe conduit is a vertical downward leg of the horizontal section, cut short and acts as a trap for the air in the air line pipe conduit.

The horizontal section may be made straight, curved or any convenient shape desired, and its length is in proportion to the entire length of air line pipe conduit so that at no time the point of contact between the liquid and the air in the conduit rises in the upward vertical leg above the horizontal section.

It is a very simple, reliable and inexpensive improvement in the liquid level gauges. There is nothing to get out of order, nothing to adjust, and once installed, it stays put for all time to come.

Figure 4:
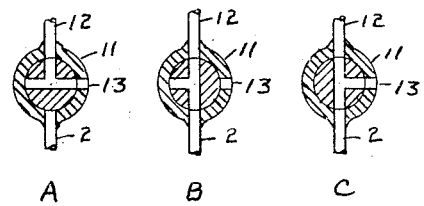
Fig. 4 shows in cross-section, the three way valve 11 provided on the air line conduit 2. In this diagram three different positions of the three way valve are shown.
Figure 6:
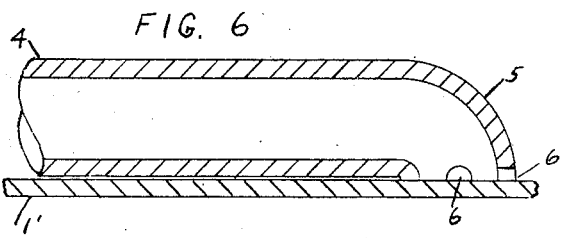
Fig. 6 shows in cross-section the detail of the pipe 4 and its end 5, used in Fig. 2.
Figure 5:
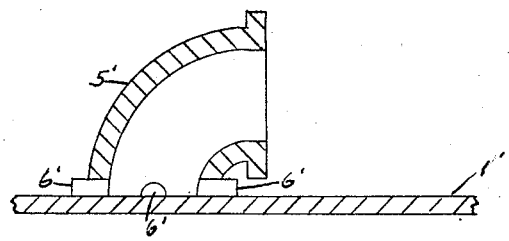
Fig. 5 shows in cross-section, the detail of L used at the end of pipe line 4' in Fig. 1.

The way to install my gauge on a liquid tank—Turn the three way valve to the position A as shown in Fig. 4, then insert the air line pipe 2 into the tank and make it fast to the tank in any convenient way to hold the pipe line in position, then connect one end of the extension pipe line to the three-way valve and the other end to a pressure indicating gauge as illustrated in the drawings. After all the connections are completed turn the valve into the position B as shown in Fig. 4.

When it is desired to recharge the air line pipe conduit with fresh air, turn the three way valve to the position C as shown in Fig. 4, then force air into the air line pipe conduit through the port hole 13 of the three way valve 11, until air bubbles come out of the end of the air line pipe in the tank, then turn the valve into the position B as shown in Fig. 4, while the air pressure is on.

I claim:

1. A device for indicating the depth or quantity of liquid in a container, comprising a pipe line conduit, enclosing a fluid having negligible weight, which serves as a pressure transmitting medium, one end of said pipe line conduit being connected to an indicator responsive to pressure, the other end being inserted into the liquid in the container to the depth of the liquid to be indicated and running horizontally for a distance then terminating with a downward bend that forms a trap for the fluid in the pipe line conduit, and an indicator responsive to pressure connected to said conduit, said trap forming end insuring that liquid in the container will exert its pressure on the fluid in the conduit and the contact surface between the liquid and the fluid though constantly shifting position due to different depths of liquid or change of temperature, is always confined to the horizontal section of the conduit within the range of operation of the device.

2. In a liquid level gauge for a liquid tank, an indicator responsive to pressure, a pipe line conduit introduced downwardly in the tank to the depth of the liquid to be indicated and enclosing a definite mass of air and connected between the indicator and the tank in such a way that the enclosed air transmits the pressure exerted on it by the liquid in the tank, means for insuring that variations in the volume of the air will not produce an error in the reading of the indicator comprising a horizontal tube provided with a trap-forming end which is the continuation and part of the pipe line conduit, the length and the cross-section of the entire pipe line conduit arranged so that the ever changing position of the contact surface between the liquid and the air is confined only to said horizontal section of the pipe line, within the range of operation of the device.

3. A device for indicating the quantity of a liquid in a liquid tank, comprising a gastight conduit, a pressure gauge on the conduit outside of the tank, a three-way valve on the conduit between the tank and the gauge for the introduction of air into the system, said conduit containing air which serves as medium for transmitting pressure, said conduit having a horizontal section provided with a trap at the end, said horizontal section and trap lying at the bottom of the tank which insures that the liquid in the tank will exert its pressure on the air in the conduit at a constant level.

4. A device for indicating the depth or quantity of liquid in a container, comprising a pipe line conduit, enclosing a fluid having negligible weight, which serves as a pressure transmitting medium, an indicator responsive to pressure, one end of said pipe line conduit being connected to said indicator, the other end being inserted into the liquid in the container to the depth to be indicated, and running horizontally for a distance, and a trap formed by a downward bend in said other end of the conduit.

5. A device for indicating the quantity of liquid in a liquid tank comprising a gastight conduit, an indicator responsive to pressure connected to the conduit outside of the tank, a three-way valve in the conduit between the tank and said indicator for the introduction of air into the system, said conduit containing air which serves as a medium for transmitting pressure, said conduit comprising in part a horizontal section at the lower limit of the liquid to be indicated provided with a trap at the end forming an inlet to said horizontal section which insures that the liquid in the tank will exert its pressure on the air in the conduit at a substantially constant level.

Signed at Baltimore city, in the State of Maryland, this 22nd day of December, A. D. 1926.

GARABED G. HEGHINIAN.